Sept. 22, 1931.    H. H. BAILEY ET AL    1,824,189
ADJUSTABLE GATE FOR CONDUITS
Filed Oct. 23, 1930
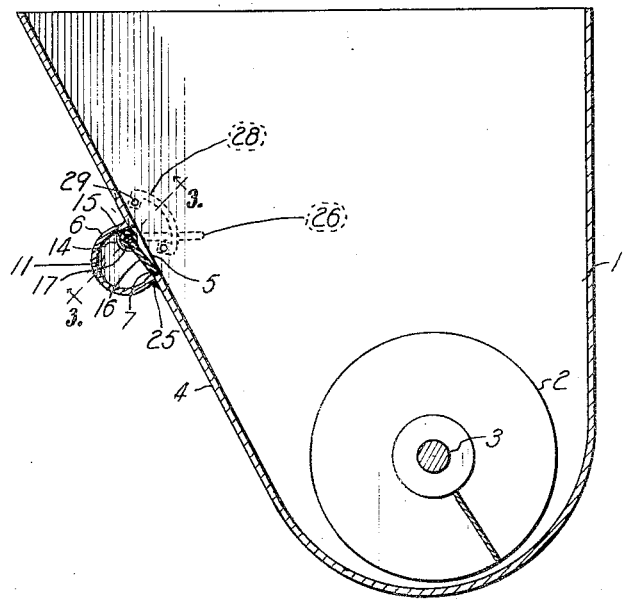
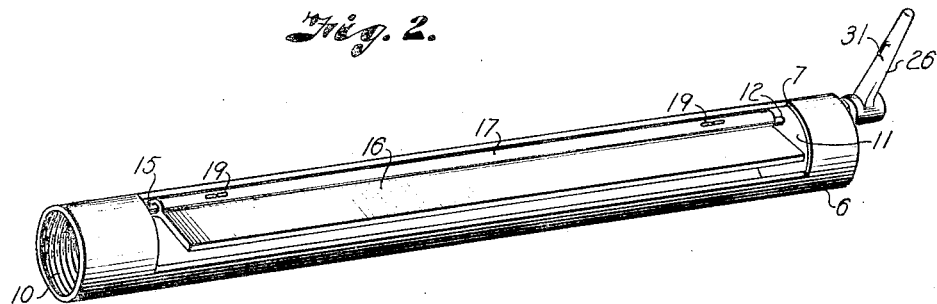
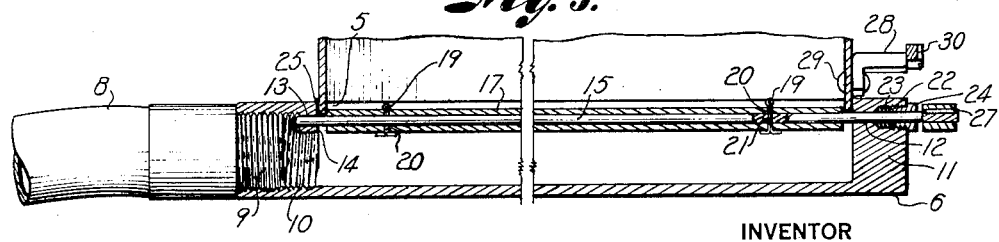
INVENTOR
Henry H. Bailey
and Jack Lee Thomas
BY
Arthur C. Brown
ATTORNEY Patented Sept. 22, 1931

1,824,189

UNITED STATES PATENT OFFICE

HENRY H. BAILEY AND JACK LEE THOMAS, OF OKLAHOMA CITY, OKLAHOMA, ASSIGNORS TO MECHANICAL ROYALTIES CORPORATION, OF OKLAHOMA CITY, OKLAHOMA, A CORPORATION OF OKLAHOMA

ADJUSTABLE GATE FOR CONDUITS

Application filed October 23, 1930. Serial No. 490,686.

Our invention relates to gate valves and more particularly to a device of that character for controlling the entrance of water into a mixing hopper; the principal object of our invention being to provide means for admitting water in sheet form into a hopper used in mixing cement and like material and to provide for readily controlling the thickness of the liquid sheet discharged into the cement.

A further object of our invention is to provide apparatus of this character that can be manufactured at low cost and that is positive in operation.

In accomplishing these and other objects of our invention we have provided improved details of structure the preferred form of which is illustrated in the accompanying drawings, wherein:

Fig. 1 is a cross sectional view of a mixing hopper provided with a valve-controlled fluid inlet embodying our invention.

Fig. 2 is a detail perspective view of the inlet pipe with a valve gate mounted therein in functional relation.

Fig. 3 is a fragmentary sectional view on the line 3—3 Fig. 1, particularly disclosing the method of hingedly mounting the valve gate in the inlet pipe.

Referring more in detail to the drawings:

1 designates a hopper such as is commonly used for mixing cement and like materials and which is provided with a spiral conveyer 2 mounted on a longitudinal shaft 3 rotatably mounted in the hopper.

An inclined front wall 4 of the hopper is provided with a longitudinal inlet opening or port 5 preferably extending throughout the length of the hopper and an inlet pipe or conduit 6 having a longitudinal opening or port 7 corresponding to the inlet opening of the hopper is connected to a source of liquid supply by a flexible hose 8 and by a nipple 9 engaging the internal threads 10 in one end of the conduit. The opposite end of the pipe is closed by an end wall 11 having a bearing opening 12 aligning with a similar bearing opening 13 which is provided in an inwardly extending lug 14 formed in the conduit near its threaded end.

The openings 12 and 13 are adapted to rotatably receive a shaft 15 whereon is mounted a swinging valve gate 16 having a sleeve portion 17 formed integral with one edge thereof for receiving the shaft 15. Cotter pins 19 extending through aligning openings 20 and 21 in the sleeve portion and shaft respectively may be employed for retaining the valve gate on the shaft in adjusted position.

In order to prevent leakage of liquid around the shaft portion extending through the closed end wall 11, the opening 12 is counter-bored and internally threaded, as indicated at 22, to receive packing material 23 and a packing gland 24 threadedly engaging the opening for compressing the packing material against the shaft.

It will be apparent from Fig. 3 that the longitudinal opening 7 in the conduit is sufficiently long to admit the end walls of the hopper so that the conduit may be welded securely to the hopper as indicated at 25; the welding being continued around the entire portion of the conduit contacting the hopper.

The length of the valve gate corresponds to the inside length of the hopper in order to permit the valve to be readily moved to open or closed position.

Means for actuating the gate include a lever 26 keyed, as indicated at 27, to the outer end of the shaft 15, and a segment 28 is fixed, as by rivets 29, to the corresponding end wall of the hopper. Notches 30 in the segment frictionally receive a projecting lug 31 on the lever to retain the valve in selected open or closed position.

Assuming a hopper to be provided with a valve constructed and assembled as described, the flow of water into a cement mixture is constrained to enter the mixture in a sheet form, thereby insuring a more thorough and rapid mix of the hopper contents.

By moving the lever on the segment the valve gate may be swingingly opened or closed to vary the thickness of the water sheet.

Since ordinary pipe may be used with a portion thereof cut away to form a valve housing having a longitudinal opening, an inexpensive valve structure is provided for controlling the flow of water into a mixing hopper.

What we claim and desire to secure by Letters Patent is:

1. In combination with a hopper having a longitudinal opening, a liquid conduit open at one end and having an opposite closed end wall and an aperture corresponding to said opening, a rocking shaft mounted in the end wall, and a rocking valve gate fixed on the shaft in functional relation with said opening and aperture to discharge the liquid in sheet form and to vary the thickness of the liquid sheet.

2. In combination with a hopper having a longitudinal opening, a conduit having an aperture corresponding to said opening, a closed wall on one end of the conduit having a bearing opening, an inwardly projecting lug in the conduit having an aligning bearing opening, a shaft journalled in said bearing openings, a valve gate for cooperating with said longitudinal opening and aperture, and means for securing the gate on said shaft.

3. In combination with a hopper having a longitudinal opening, a conduit having an aperture corresponding to said opening, a shaft rotatably mounted in said conduit in parallel relation with the aperture, a valve gate fixed to said shaft, means for rocking the shaft to adjust the gate relative to the aperture, and means for maintaining the valve gate in adjusted position.

4. In combination with a hopper including a side wall having a longitudinal opening, a conduit having a portion cut away to form a recess for receiving said side wall and forming an aperture complementary to said opening, a shaft rotatably mounted in said conduit in parallel relation with the aperture, and a valve gate fixed to said shaft and adapted to close said aperture.

5. In combination with a hopper including a side wall having a longitudinal opening, a conduit having a portion cut away to form a recess for receiving said wall and forming an aperture complementary to said opening, a shaft rotatably mounted in said conduit in parallel relation with the aperture, a valve gate fixed on said shaft and adapted to close said aperture, means for opening and closing said gate, and means on said hopper for maintaining the gate in adjusted position.

6. In a device of the character described, a conduit having a longitudinal aperture, a closed wall on one end of the conduit having a bearing opening, an inwardly projecting lug in the conduit having an aligning bearing opening, a shaft journalled in said bearing openings, a valve gate for controlling flow of fluid through said aperture, and means for securing the gate on said shaft.

7. In a device of the character described, a conduit having a longitudinal aperture, a shaft, a closed wall on one end of the conduit having a bearing opening for journalling one end of the shaft, means in the conduit for journalling the opposite end of the shaft, a valve gate for controlling flow of fluid through said aperture, means for securing the gate on said shaft, and means for rotating the shaft.

8. In a device of the character described, a conduit having a longitudinal aperture, a shaft, a closed wall on one end of the conduit having a bearing opening for journalling one end of the shaft, means in the conduit for journalling the opposite end of the shaft, a valve gate for controlling flow of fluid through said aperture and having a sleeve portion formed integral with one edge thereof and adapted to receive said shaft, and means for securing the gate on said shaft.

In testimony whereof we affix our signatures.

HENRY H. BAILEY.
JACK LEE THOMAS.